Sept. 16, 1952  R. D. GAYNER ET AL  2,610,880
LATCH MECHANISM
Filed Aug. 6, 1948
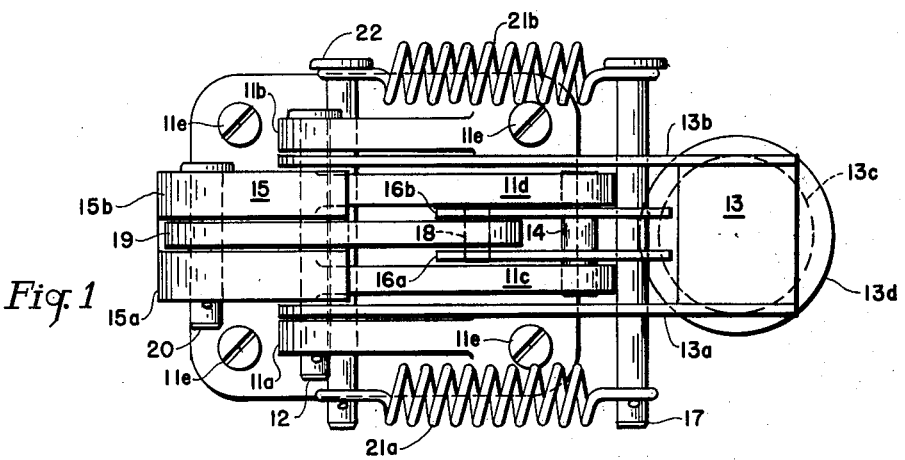
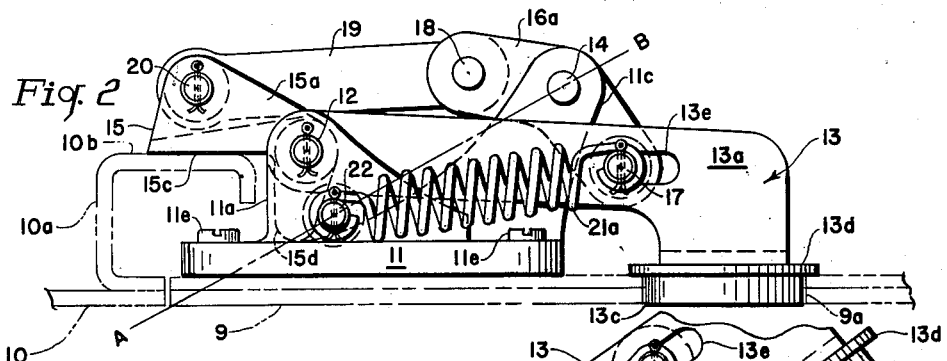
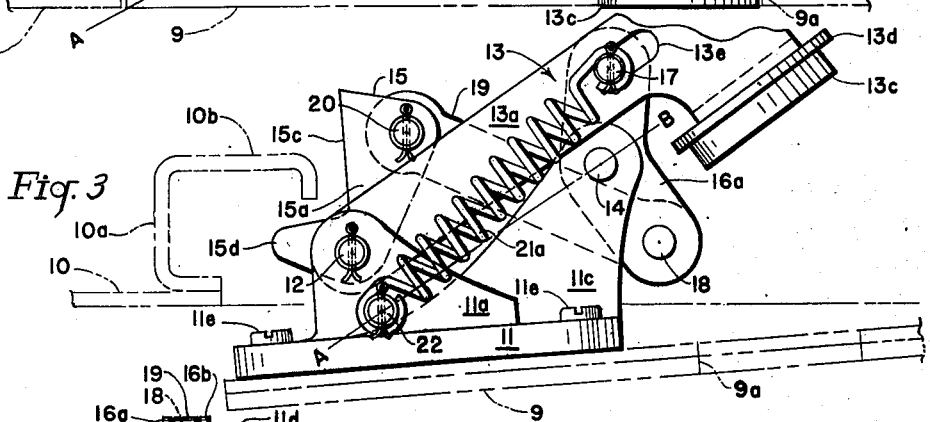
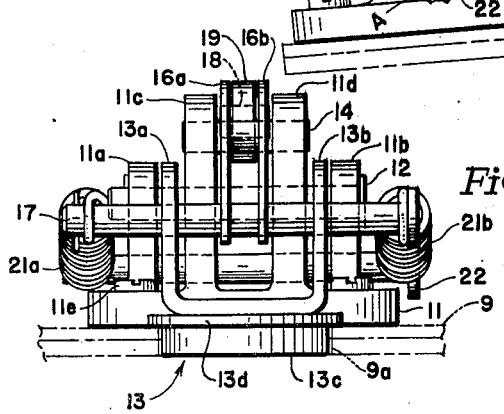
Raymond D. Gayner
Thurman C. Wood
Milburn C. Copold
INVENTORS.
BY *James M. Clark*
ATTORNEY Patented Sept. 16, 1952

2,610,880

UNITED STATES PATENT OFFICE 2,610,880

LATCH MECHANISM

Raymond D. Gayner, Sherman Oaks, and Thurman C. Wood, Inglewood, Calif., and Milburn C. Copold, Roselle, N. J., assignors to North American Aviation, Inc.

Application August 6, 1948, Serial No. 42,937

9 Claims. (Cl. 292—332)

1

The present invention relates to closure latches and more particularly to improvements in positive acting latch mechanisms for closures or doors of the flush and other types.

In certain structures, and more particularly in aircraft and other high-speed vehicles, it is required that numerous openings be provided throughout the structure through which ready access may be gained to the interior of the structure for purposes of inspection, servicing and adjustment. For the purposes of streamlining these openings and reducing drag and resistance, they are necessarily closed by doors which must lie flush with the exterior surfaces of the structure or aircraft; and to facilitate efficient and rapid operation, these doors must be quickly opened and closed. Inasmuch as aircraft and other high-speed vehicles are subject to considerable vibration during their normal operation, it is necessary that the latches for these closures be positively locked in their closed position and not subject to inadvertent opening. These requirements have contributed in the past to the design and use of heavy and complicated latches which have heretofore served their purposes but have been found unnecessarily cumbersome, heavy and intricate. The improved latch comprising the present invention accomplishes all of the advantages and features provided by the prior locks and does so in a positive and more efficient manner.

It is, accordingly, a primary objective of the present invention to provide a simple, inexpensive and quick-acting positive latching mechanism of the flush type. It is a further object to provide a flush type door latch which is capable of providing a doubly positive lock under all load conditions. A further object resides in the provision of a single push-button actuator flush with the outer wall or skin surface for releasing the latching mechanism. It is a still further objective to provide an improved double toggle latch mechanism which is automatically returned to the positively locked position when the door is fully closed to thereby accommodate the latching of the door without the necessity of providing a further button or other manual means. It is a supplementary object of this invention to provide an improved arrangement and details of the several elements comprising the improved latching mechanism.

Other objects of the present invention will become apparent to those skilled in the art upon reading the following description taken together with the accompanying drawings forming a part hereof in which:

2

Fig. 1 is a plan view of a preferred form of the present latch mechanism in the closed position;

Fig. 2 is a side elevational view of the same showing its relationship to the closure and adjacent frame in the closed condition;

Fig. 3 is a similar view of the same in its released and partially opened condition; and Fig. 4 is an end elevational view of the latch mechanism as shown in the closed conditions of Figs. 1 and 2.

The numeral 9 represents a closure or door for an opening within a wall or enclosure represented by the numeral 10. For purposes of the present description, the closure 9 may be an access door for an opening within the skin covering 10 which is provided with an attached jamb element 10a. As viewed in Figs. 2 and 3, the closure 9 is pivotally mounted upon a suitable hinge (not shown) which would be located toward its right edge such that the door may be lowered or rotated downwardly in a counterclockwise direction. As viewed in Figs. 2 and 3, the access opening would accordingly be in the undersurface of the skin covering 10, which might be the wing, or fuselage, or other portion of an airplane. It will, of course, be understood that the improved latch mechanism of the present invention is equally applicable to closures for other vehicles or structures and that the opening may be in other than the lower surface of such structures. The present mechanism is also well adapted for use in pressurized aircraft by the use of suitable seals or gaskets.

The improved latch mechanism comprises essentially a fixed base plate or supporting element 11 which is fixedly attached to the inner surface of the closure 9 by suitable screws 11e, or other fastening means. A pair of integrally formed lugs 11a and 11b extend upwardly from the rear face of the base plate 11 and are suitably apertured at their upper forward portions for the pivot pin 12. A similar pair of bifurcation forming lugs 11c and 11d extend from the same back face of the base plate 11 at its opposite edge, away from the jamb member 10a, and are similarly apertured for a fulcrum pivot pin 14. The lugs 11a and 11b are more widely spaced apart than the lugs 11c and 11d, but the latter, however, extend upwardly from the rear face of the base plate 11 for a greater distance.

An actuating lever, or the pivotal arm assembly 13 comprises a spaced pair of arms or bifurcations 13a and 13b which are interconnected at their free terminals by an integral U-shaped portion the bottom of which is fixedly attached to a manually actuated circular or cylindrical push-button portion 13c at the upper edge of which there projects a circular flange 13d. The forward ends of the bifurcated arms 13a and 13b are apertured and pivotally mounted upon the pin 12 and these arms are spaced a lesser distance apart than the lugs 11a and 11b against the opposed surfaces of which they are contiguous. The above mentioned arms 11c and 11d are less widely spaced than the arms 13a and 13b such that the latter extend at either side of and clear the intermediate arms 11c and 11d. The closure 9 is provided with a circular opening 9a therethrough to permit operation of the push-button portion 13c for the unlatching of the mechanism. The arms 13a and 13b are provided at an intermediate portion with longitudinally extending slots 13e to permit the relative movement of a pin 17 therewithin as will be more fully explained below.

A latch dog element 15 is also pivotally mounted upon the pivot pin 12 as is also the arm assembly 13. The latch dog element 15 is provided with bifurcated arm portions 15a and 15b, which are less widely spaced apart than the arms 13a and 13b, within which they are permitted to oscillate between the opened and closed positions of the mechanism, and the lower face of their interconnecting portion forms a bearing or contact surface 15c which is adapted to bear firmly against the flat back surface or strike plate portion 10b of the jamb element 10a. The latch dog element 15 also has integrally formed thereon a radially extending tongue or camming portion 15d extending radially from the axis of the pin 12 and substantially normal to the plane of the bearing surface 15c.

A pair of bellcrank lever elements 16a and 16b pivoted for rotation about the fulcrum pivot 14 and are apertured at their outer terminals to receive the pins 17 and 18. These bellcrank lever elements are spaced apart such that they come inside the bifurcated arms 11c and 11d and their upper forward terminals embrace and are pivotally connected by the pin 18 to the interconnecting link 19, which in turn is connected at its forward terminal by the pivot 20 to the above mentioned latch dog element 15. The bifurcated arms 11a and 11b are also apertured to receive the transverse pin 22 which forms the fixed anchorage for the tension springs 21a and 21b which extend upwardly and rearwardly at each side of the latching mechanism. These springs are connected at their upper rearward terminals to the aforementioned pin 17 which passes through the opposite terminals of the bellcrank lever elements 16a and 16b and this pin also is capable of movement back and forth within the slots 13e of the actuating lever assembly 13. It will accordingly be noted that the fixed base plate 11 provides lugs which support the pivot 12 about which are rotatable the operating lever assembly 13 and the latch dog element 15. These same lower supporting lugs 11a and 11b also provide the support for the anchorage pin 22 for the springs 21a and 21b. The other and higher supporting lugs 11c and 11d are apertured to accommodate the pivot pin 14 about which the bellcrank levers 16a and 16b are rotatable. One end of the bellcrank lever unit is pivotally attached by the pivot pin 17 to the actuating lever assembly 13 at the slot 13e, and the opposite end of the bellcrank lever unit is pivotally interconnected to the latch element 15 by the interconnecting link 19. Accordingly, it will be seen that manual movement of the actuating lever assembly 13, pivotal about the pivot 12, causes rotation of the bellcrank unit 16a—16b, which rotation imparts pivotal movement to the latch dog element 15 about its pivot 12, the dog element 15 rotating in an opposite direction than that which is manually imparted to the actuating assembly 13. The disposition of the tension springs 21a and 21b being positively connected to one end of the bellcrank unit by means of the pivot 17 and in engagement with the slots 13e of the actuating arm assembly 13, serves as a quick-acting means to assist in rotating the actuating arm assembly 13 and the bellcrank unit 16a—16b into either the closed or fully opened position of the latch dog element 16 depending upon the position into which the actuating arm assembly 13 may be moved. As indicated in Figs. 2 and 3, the line A—B interconnecting the centers of the pins 22 and 14 defines a dead centerline away from which the springs 21a and 21b endeavor to move. This provides a quick-acting, snap action make and break toggle arrangement which either positively locks the closure in its latched position, or which on the other hand positively retains the latching element in its unlatched position.

Referring now to Fig. 2 which shows the mechanism in its positively latched condition in which the bearing face 15c is held against the strike plate portion 10b of the jamb strip 10a, the latch may be released by pressing inwardly upon the push-button portion 13c of the actuating arm assembly 13, accessible through the opening 9a in the closure. The opening 9a is preferably located near the latch and through the door, but may be at an edge thereof or even through the adjacent wall. This counterclockwise movement of the actuating arm assembly 13 about its pivot 12 causes rotation of the bellcrank lever unit 16a—16b about its pivot 14, also in a counterclockwise direction, until the pin 17, which forms the outer anchorage for the springs 21a and 21b, passes beyond the dead centerline A—B. In its initial movement toward the dead centerline the distance of the pin 17 from the pin 22 gradually increases due to the pivotation of the bellcrank lever and in this initial portion of the movement the operation is resiliently opposed by the increasing tension developed within the springs 21a and 21b. As the pin 17, however, passes beyond the dead centerline A—B, at which point the pin 17 has moved toward the outer end of the slots 13e, the spring assists and imparts further and rapid counterclockwise rotation to the actuating arm assembly 13. Accordingly, manual pressure against the push-button 13c is only required to be applied up to the point at which the pin 17 passes beyond the line A—B, and beyond this point the spring 21a and 21b snap the mechanism with a quick and positive action into the unlatched condition shown in Fig. 3.

As the above mentioned inward and upward movement of the push-button 13c is started, the concurrent movement of the bellcrank unit 16a—16b imparts downward movement to the pin 18, to and across the line connecting the pivots 14 and 20 which causes a momentary increase in the pressure exerted by the latch dog element 15 against the strike plate 10b due to the slight spreading between pivots 14 and 20. This will be permitted by a slight springing of the jamb member 10a which serves to supplement the locking effect of the springs 21a—21b. The initial necessity of spreading these pivots provides a further positive locking means in addition to the locking effect of the springs and the mechanism is accordingly doubly positively locked. As the center of the pin 18 passes beyond or below this line, and approaches the dead centerline A—B, it tends to rotate the latch dog element 15 in a counterclockwise direction about its pivot 12. This movement is followed by the foregoing quick action of the springs which causes the latch element 15 to be rapidly rotated into the open or unlatched position shown in Fig. 3, in which the tongue 15d of the latch element 15 momentarily engages the underneath edge of the jamb 10a and causes the closure 9 to be moved outwardly into its partially opened but unlatched position. In this position the closure 9 can be grasped manually at a suitable point or by a handle for further rotating the same into its fully opened position, the mechanism mounted upon the back of the closure clearing the jamb member 10a, as shown in Fig. 3, as it is opened.

It will, accordingly, be noted that the improved latch provides a double positive lock under all load conditions and provision for releasing the latch is made by a single push-button flush with the outer skin or wall surface. It will also be noted that as the closure 9 is rotated from its position shown in Fig. 3, to the closed position the tongue 15d of the latch element 15 engages the edge of the jamb strip 10a causing counterclockwise rotation of the latch element 15 which moves the bellcrank lever assembly 16a—16b, in the clockwise direction through the medium of the link 19, thereby returning the pin 17 beyond the dead centerline A—B. As the mechanism is caused to rotate beyond the dead centerline the springs 21a and 21b serve to return the mechanism with a quick and positive action into the latched position shown in Fig. 2 in which the pivot 18 is forced beyond the line between pins 14 and 20 and the latch element 15 again firmly engages the strike plate portion 10b and the push-button plate 15c is caused to again enter the circular opening 9a in the closure 9 in a flush relationship as determined by the flange 13d engaging the rear or inner face of the closure. In this position of the latching elements, it will be seen that the closure 9 is also flush with the adjacent skin or wall surface 10. It will accordingly be noted that the disclosed mechanism is automatically returned to the positively locked position when the door has been pushed into its fully closed position. This provision accommodates the positive and automatic latching of the door without the necessity of providing a further actuating button or other manual means. While the preferred embodiment shows a flush closure and push-button arrangement the improved latch of the present invention may also be advantageously applied in other than flush closure installations.

Other forms and modifications of the disclosed mechanism, both in respect to its general arrangement and the details of its several parts, which may become apparent to those skilled in the art after reading the foregoing description, are all intended to come within the scope and spirit of the present invention as more particularly defined in the appended claims.

We claim:

1. The combination with a closure for a wall having an opening therein, of a latch element pivotally carried by said closure, an actuating lever pivotally carried by said closure and accessible from the outer face thereof, a bellcrank lever pivotally carried by said closure and pivotally engaging said actuating lever, link means pivotally interconnecting said latch element and said bellcrank lever arranged to provide a toggle action locking force upon said latch element and resilient means acting in the latched condition of said closure to assist said toggle action.

2. In a closure latching mechanism for a wall having an opening therein and a closure arranged to fit within said wall opening, a latch element pivotally mounted upon said closure having angularly disposed wall engaging faces, a first of said faces engaging the back of said wall in the latched condition of said closure, the second of said faces engaging the front of said wall during the closing movement of said closure for the pivotation of said latch element and the automatic latching engagement of its first said face with said wall, spring-biased toggle mechanism pivotally connected to said latch element arranged to impart quick movement beyond a dead center in said latched and unlatched positions, and an actuating lever associated with said toggle mechanism having a manually engageable portion accessible through the front face of said closure arranged to trip said mechanism against the biasing of said spring for the unlatching pivotation of said latch element.

3. A closure latching mechanism for a wall having an opening therein and a closure arranged for the closing of said wall opening comprising a latch element pivotally supported upon said closure, an actuating lever pivotally supported by said closure and having an operating portion accessible from the outer face of said closure through an opening therein, lever means pivotally carried by said closure pivotally engaging said actuating lever, link means pivotally interconnecting said latch element and said lever means arranged to provide a toggle action locking force upon said latch element, stop means carried upon the operating portion of said actuating lever engageable with the edge of said opening within said closure for limiting the pivotal movement of said latch element in engagement with said wall in its latched condition, and resilient means connecting said closure with the interconnection of said actuating lever with said lever means for effecting said toggle action.

4. A latching mechanism of the type set forth in claim 3 characterized by a cooperative relationship of said stop means on the operating portion of said actuating lever with respect to the thickness of said closure being such as to cause the face of said operating portion to be flush with the outer face of said closure in the latched condition of said mechanism in which said latch element in engagement with said wall causes the outer faces of said closure and said wall to be in a substantially flush relationship.

5. In a closure latching mechanism for a wall having an opening therein and a closure arranged for closing said wall opening, mechanism for latching said closure to said wall comprising an actuating lever pivotally mounted upon said closure and having a portion accessible from the outer face of said wall, a latch element pivotally supported upon said closure arranged to engage the edge of said wall opening to prevent the opening of said closure, a bell-crank lever pivotally carried by said closure and pivotally engaging said actuating lever at a common pivotal connection, link means pivotally connecting said latch element with said bell-crank lever, stop means carried upon said accessible lever portion engageable with said closure for limiting the pivotal movement of said latch element in engagement with said wall in the latched position, and resilient means interconnecting said closure with the said common pivotal connection of said actuating lever with said bel-crank lever arranged in the accessible position of said actuating lever portion to maintain said latch element in its engaged position in which said stop means is in engagement with said closure.

6. A closure latching mechanism for a wall having an opening therein and a closure arranged to fit within said wall opening, said mechanism comprising an actuating lever pivotally supported from the rear face of said closure, a latch element pivotally supported upon said closure arranged to engage a rearwardly facing portion of the wall for latching said closure to said wall, said actuating lever having a portion manually engageable at a forwardly facing portion through an orifice in said closure, toggle-forming lever means pivotally supported upon said closure engaging said actuating lever at a first terminal of said lever means and pivotally interlinked with said latch element at its opposite terminal, stop means carried upon the forwardly facing manually engageable portion of said actuating lever engageable with said closure for limiting the pivotal movement of said latch element in its engagement with the wall in the closed position of said closure, and resilient means engaging said toggle-forming lever means arranged to move said latch element with a quick toggle action in a first direction into its opened position in which the action of said resilient means is limited by the engagement of a portion of said toggle-forming lever means with the pivotal support of said lever means upon said closure, the said engagement of said resilient means with said toggle-forming lever means also arranged to move said latch element in an opposite direction into its closed position in which further movement of said stop means is prevented by its engagement with said closure.

7. Latch mechanism for a wall having an opening and a closure arranged to fit within said opening, said closure having an opening therethrough, said latch mechanism mounted upon said closure and including a dog element pivotally mounted upon said closure arranged to latchingly engage an edge of said wall opening a bell-crank lever pivotally mounted at an intermediate portion upon said closure, an interconnecting link pivotally engaging said dog element at one terminal and said bell-crank lever at its other terminal, tensioning means connecting said closure with said bell-crank lever arranged to urge said interconnecting link and bell-crank lever into either the opened or closed position of said dog element, an actuating arm pivotally mounted upon said closure and having a slotted opening, a pivot pin passing through said slotted opening in pivotal engagement with said bell-crank lever, said actuating arm having a terminal portion disposed within said opening in said closure in a flush relationship with the outer surface of said closure in the closed position only of said closure, said terminal arranged to be manually actuated by being forced rearwardly from said closure for moving said interconnecting link and bell-crank lever means under the influence of said tensioning means causing said dog element to be pivotally rotated into its opened unlatched position.

8. The combination with a closure and the subject matter called for in claim 1 characterized by the inclusion of an extending portion carried by said actuating lever in the region of its portion which is accessible from the outer face of said closure arranged to provide a limit stop in opposition to said resilient means and against said toggle action to establish the locking position of said latch element in engagement with said wall.

9. In a closure latching assembly of the type set forth in claim 1 characterized by the inclusion of a tensioning spring in said resilient means urging the pivotal connection of said actuating lever to said bell-crank lever toward the pivotal mounting of said bell-crank lever upon said closure.

RAYMOND D. GAYNER.
THURMAN C. WOOD.
MILBURN C. COPOLD.

REFERENCES CITED

The following references are of record in the file of this patent:

UNITED STATES PATENTS

| Number | Name | Date |
|---|---|---|
| 1,242,749 | Wells | Oct. 9, 1917 |
| 2,451,381 | Curtiss | Oct. 12, 1948 |

FOREIGN PATENTS

| Number | Country | Date |
|---|---|---|
| 632,624 | Germany | July 10, 1936 |